(12) United States Patent
De Schutter et al.

(10) Patent No.: US 11,299,696 B2
(45) Date of Patent: Apr. 12, 2022

(54) BEER OR CIDER BASE

(71) Applicant: Anheuser-Busch InBev S.A., Brussels (BE)

(72) Inventors: David De Schutter, Leuven (BE); Pierre Adam, Leuven (BE)

(73) Assignee: Anheuser-Busch InBev. S.A., Brussels (BE)

( * ) Notice: Subject to any disclaimer, the term of this patent is extended or adjusted under 35 U.S.C. 154(b) by 693 days.

(21) Appl. No.: 15/571,030

(22) PCT Filed: Jun. 17, 2016

(86) PCT No.: PCT/EP2016/064062
§ 371 (c)(1),
(2) Date: Oct. 31, 2017

(87) PCT Pub. No.: WO2016/207079
PCT Pub. Date: Dec. 29, 2016

(65) Prior Publication Data
US 2018/0112161 A1 Apr. 26, 2018

(30) Foreign Application Priority Data

Jun. 22, 2015 (EP) .................................... 15173219
Nov. 9, 2015 (EP) .................................... 15193629

(51) Int. Cl.
*C12C 11/11* (2019.01)
*C12H 3/04* (2019.01)
*C12C 5/02* (2006.01)

(52) U.S. Cl.
CPC .............. *C12C 11/11* (2013.01); *C12C 5/026* (2013.01); *C12H 3/04* (2019.02)

(58) Field of Classification Search
CPC ............. C12C 5/026; C12C 11/11; C12H 3/04
USPC .................................................. 426/590, 592
See application file for complete search history.

(56) References Cited

U.S. PATENT DOCUMENTS

| 4,265,920 A | 5/1981 | Thijssen |
| 4,440,795 A | 4/1984 | Goldstein et al. |

(Continued)

FOREIGN PATENT DOCUMENTS

| CN | 1894394 | 1/2007 |
| CN | 104220585 | 12/2014 |

(Continued)

OTHER PUBLICATIONS

Hong Xia, ed., "Food Chemistry," p. 100, China Agricultural Press, May 31, 2002 (English translation not available).

(Continued)

*Primary Examiner* — Vera Stulii
(74) *Attorney, Agent, or Firm* — Levy & Grandinetti

(57) ABSTRACT

A method for preparing an aromatic beverage is as follows. The method includes subjecting a fermented beverage to a first filtration step including nanofiltration or ultrafiltration to obtain a retentate fraction and a permeate fraction including alcohol and volatile flavour components. Then, the method includes subjecting the permeate fraction including alcohol and volatile flavour components to a second filtration step of reverse osmosis to obtain a base liquid of at least 2% ABV. Combining the base liquid with exogenous aromas thereby obtains the aromatic beverage. Desirable fermented beverages are a beer or a cider.

12 Claims, 1 Drawing Sheet

(56) References Cited

U.S. PATENT DOCUMENTS

| | | | |
|---|---|---|---|
| 4,532,140 A | 7/1985 | Bonnome | |
| 4,792,402 A * | 12/1988 | Fricker | C12H 3/04 210/651 |
| 5,324,435 A | 6/1994 | Girard et al. | |
| 2006/0088632 A1 | 4/2006 | Armes et al. | |
| 2007/0116801 A1 | 5/2007 | Kowalczyk et al. | |
| 2008/0272041 A1 * | 11/2008 | Wollan | C12H 3/04 210/180 |
| 2010/0047386 A1 | 2/2010 | Tatera | |
| 2015/0017280 A1 | 1/2015 | Vanderhaegen | |

FOREIGN PATENT DOCUMENTS

| | | | |
|---|---|---|---|
| CN | 104513774 | 4/2015 | |
| DE | 502004007319 | 7/2008 | |
| EP | 0557325 | 9/1993 | |
| EP | 1 571 200 | 9/2005 | |
| EP | 1 611 940 | 1/2006 | |
| EP | 3 026 104 | 6/2016 | |
| GB | 1472980 * | 5/1977 | C12C 11/11 |
| JP | S58-121788 | 7/1983 | |
| JP | S58-209975 | 12/1983 | |
| RU | 2046134 | 10/1995 | |
| RU | 2004111963 | 9/2005 | |
| WO | WO 92/08783 | 5/1992 | |
| WO | WO 99/47636 | 9/1999 | |

OTHER PUBLICATIONS

Meijuan Yuan ed., "Beverage Technology," pp. 106-108, China Light Industry Press, Jan. 31, 2013 (English translation not available).

* cited by examiner

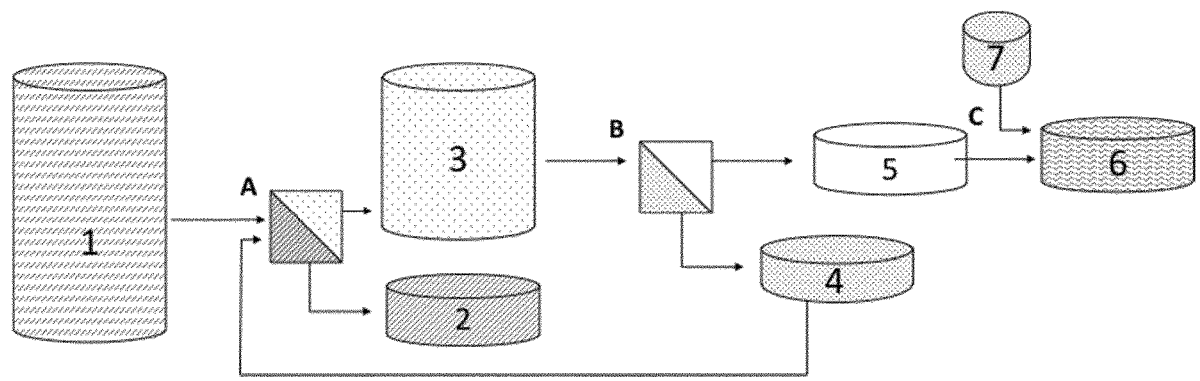

BEER OR CIDER BASE

TECHNICAL FIELD

The present invention concerns a method for preparing a beverage comprising a malt-based or cider-based liquid and an exogenous component. In particular, the invention concerns a method wherein the first step involves a subjecting a fermented beverage to a first filtration step to obtain a permeate fraction that is subsequently subjected to a second filtration step to obtain a base liquid comprising a majority of the ethanol content of the fermented beverage and subsequently adding an exogenous component to the base liquid thereby obtaining a desired aromatic beverage.

BACKGROUND OF THE INVENTION

Beer derived beverages are gaining more interest rapidly as these allow further diversification of tastes and beverage design, yet still based on ethanol obtained by natural fermentation processes.

Key in the production of such beer derived beverages is obtaining a taste-neutral ethanol comprising base liquid whereto aromas of choice can be added. The taste-neutral ethanol comprising base is ideally easy and cost-efficient to produce.

It is know to obtain an ethanol enriched fraction from beer for the purpose of producing beer concentrates. U.S. Pat. No. 4,265,920 and U.S. Pat. No. 4,532,140 teach two-step methods for obtaining a high-alcohol beer concentrate that can be reconstituted to beers of normal alcohol content. The method of U.S. Pat. No. 4,265,920 comprises a first distillation step to separate ethanol and volatile aroma components from the retentate comprising the rest of the beer components, which is followed by a second step comprising a rather costly freeze-concentration procedure to concentrate the retentate from the first step. Finally, the distilled ethanol from step 1 is combined with the freeze-concentrated retentate from step 2, resulting in the final ethanol-enriched beer concentrate. The method of U.S. Pat. No. 4,532,140, on the other hand, in the first step subjects beer to ultrafiltration to obtain a concentrated retentate and an aqueous permeate that is then, in the second step subjected to reverse osmosis to concentrate ethanol and volatile compounds; lastly, the alcohol fraction from step 2 is pulled with the retentate from step 1 to obtain the final beer concentrate.

Although at least some of the above described methods provide a general approach for concentrating beer including its alcohol content they focus on retaining as much as possible of the original beer components with the exception of water, rather than on obtaining a liquid fraction comprising a majority of the original alcohol content and purified from most non-volatile aromas, while maintaining a high throughput and minimizing alcohol losses.

The present invention provides a method for producing a beverage comprising a malt-based liquid and an exogenous component, wherein the malt-based liquid concerns a naturally alcohol containing malt-based liquid having an alcohol content of 5 ABV or higher. These and other advantages of the present invention are presented in continuation.

SUMMARY OF THE INVENTION

The present invention is defined in the appended independent claims. Preferred embodiments are defined in the dependent claims. In particular, the present invention concerns a method for preparing an aromatic beverage, the method comprising the steps of:
  a) Subjecting a fermented beverage (1) to a first filtration step comprising nanofiltration (A) or ultrafiltration to obtain a retentate fraction (2) and a permeate fraction comprising alcohol and volatile flavour components (3);
  b) Subjecting the permeate fraction comprising alcohol and volatile flavour components to a next filtration step comprising reverse osmosis, to obtain a base liquid comprising at least 2 ABV;
  c) Combining the base liquid from b) with exogenous aromas thereby obtaining the aromatic beverage.

Preferably, the fermented beverage is a beer or cider, such as a beer or cider having an alcohol concentration comprised between 2-16% ABV, preferably between 2.5-10% ABV, most preferably between 3-8% ABV. In case of a beer, the fermented beverage preferably is high gravity beer defined as beer of original gravity of 14-25 °P or even higher.

The nanofiltration (A) in step a) preferably is is a high-pressure nanofiltration, defined as nanofiltration conducted under a pressure in the range of 18-41 bar, preferably in the range of 20-30 bar.

The second filtration step (B) in b) preferably first comprises reverse osmosis, and then further comprises at least one additional treatment of the fraction comprising ethanol obtained following said reverse osmosis, said treatment comprising distillation, fractionation, or reverse osmosis.

The base liquid (4) obtained in step b) preferably comprises between 2-20% ABV.

BRIEF DESCRIPTION OF THE FIGURES

For a fuller understanding of the nature of the present invention, reference is made to the following detailed description taken in conjunction with the accompanying drawings in which:

FIG. 1: shows a block diagram schematically illustrating key steps of the method according to the present invention. A—first concentration step comprising nanofiltration or ultrafiltration; B—second concentration step comprising reverse osmosis; C—combining of the retentate from the second concentration step with exogenous aromas.

1—beer subjected to nanofiltration; 2—retentate; 3—permeate comprising ethanol and volatile aroma components; 4—base liquid comprising at least . . . vol % of the alcohol originally present in the fermented beverage; 5—leftover fraction from the second concentration step; 6—aromatic beverage; 7 exogenous aromas.

DEFINITIONS

As used herein, the term "beer" is to be construed according to a rather broad definition:
  "the drink obtained by fermenting from a wort, prepared with starchy or sugary raw materials, including hop powder or hop extracts and drinkable water. Aside from barley malt and wheat malt, only the following may be considered for brewing, mixed with e.g. wheat malt, starchy or sugary raw materials in which the total quantity may not exceed 80%, preferably 40% of the total weight of the starchy or sugary raw materials:
    (a) maize, rice, sugar, wheat, barley and the various forms of them.
    (b) saccharose, converted sugar, dextrose and glucose syrup.

Although according to certain national legislations, not all fermented malt-based beverages can be called beer, in the context of the present invention, the term "beer" and "fermented malt based beverage" are used herein as synonyms and can be interchanged. It follows, that as used herein the terms "reconstituted beer" and "reconstituted fermented malt based beverage" are to be understood as beverages composition-wise substantially identical to beer but obtained by addition of the solvent, i.e. water or carbonated water, to a previously prepared beer concentrate.

Next, as used herein, the term "cider" is to be understood as every alcoholic beverage resulting from the fermentation of apple juice or apple juice mixed with up to 10% pear juice. This term also encompasses the any product of this fermented apple juice further modified by adding such standard cider manufacturing additives as acids (citric or tartaric) and/or sugar, filtering, cooling, saturating with carbon dioxide, pasteurizing, etc., which is commercialized under the term cider.

As used herein, the term "unfilterable compounds" is to be understood as referring to all the diverse compounds comprised in any type of beer or cider, which cannot pass through a nanofiltration membrane, i.e. beer compounds having the mean size greater than 150 Da, 180 Da, or 200 Da, which is the molecular weight retention size cut-off depending on a given nanofiltration membrane. As opposed to the "filterable compounds" comprising water, monovalent and some bivalent ions, low molecular alcohols such as ethanol, low molecular esters and a number of volatile flavour components, the unfilterable compounds mainly include sugars, mostly polysaccharides; sugar alcohols, polyphenols, pentosans, peptides and proteins, high molecular weight alcohols, high molecular weight esters, partially multivalent ions, and many other mainly organic and highly divergent compounds that vary depending on the beer or cider type. Due the complexity and discrepancies between different beer or cider compositions, the collective concentration of the unfilterable compounds is often referred to (in great simplification and without being exact) as "concentration of sugars" or "concentration of solids" and can be easily calculated from mass balance considerations taking into account of parameters such as density, viscosity, beer rheology, original gravity or extract, real gravity or extract, degree of fermentation (RDF) and/or alcohol content. In brewing practice, the concentration of unfilterable compounds is routinely estimated from density (real extract) measurement corrected for the density of the measured ethanol amount, ethanol being the most prevalent compound of density<1 $g/cm^3$ and therefore affecting the density measurement most substantially. Such measurements are well known in the art, are routinely performed using standard beer analysing systems like Anton Paar Alcolyzer device, and thus are readily and easily performable by any person skilled in beer brewing.

The amount of components dissolved in beer can also be expressed as so called specific gravity (relative density) or apparent specific gravity. The first one is measured as density (weight per unit volume) of beer divided by the density of water used as a reference substance, whereas the second one as the weight of a volume of beer to the weight of an equal volume of water. For example, a specific gravity of 1.050 ("50 points") indicates that the substance is 5% heavier than an equal volume of water. The densities of water, and consequently also beer, vary with temperature; therefore for both specific gravity and apparent specific gravity the measurement of the sample and the reference value is done under the same specified temperature and pressure conditions. Pressure is nearly always 1 atm equal to 101.325 kPa, while temperatures may differ depending on the choice of further systems for approximating beer density. Examples of such systems are two empirical scales, Plato and the Brix scale, that are commonly used in brewing and wine industries, respectively. Both scales represent the strength of the solution as percentage of sugar by mass; one degree Plato (abbreviated °P) or one degree Brix (symbol °Bx) is 1 gram of sucrose in 100 grams of water. There is a difference between these units mainly due to both scales being developed for solutions of sucrose at different temperatures, but it is so insignificant that they may be used virtually interchangeably. For example, beer measured at 12° Plato at 15.5° C. has the same density as a water-sucrose solution containing 12% sucrose by mass at 15.5° C., which is approximately equal to 12° Brix, being the same density as a water-sucrose solution containing 12% sucrose by mass at 20° C. The Plato and Brix scales have an advantage over specific gravity in that they expresses the density measurement in terms of the amount of fermentable materials, which is particularly useful at early stages of brewing. As, of course, both beer and wort are composed of more solids than just sucrose, it is not exact. The relationship between degrees Plato and specific gravity is not linear, but a good approximation is that 1°P equals 4 "brewer's points" (4×0.001); thus 12° Plato corresponds to specific gravity of 1.048 [1+(12× 4×0.001)].

The term "original gravity" or "original extract" refers to specific gravity as measured before fermentation, whereas the term "final gravity" or "final extract" relates to specific gravity measured at the completion of fermentation. In general, gravity refers to the specific gravity of the beer at various stages in its fermentation. Initially, before alcohol production by the yeast, the specific gravity of wort (i.e. the ground malt before beer fermentation) is mostly dependent on the amount of sucrose. Therefore, the original gravity reading at the beginning of the fermentation can be used to determine sugar content in Plato or Brix scales. As fermentation progresses, the yeast convert sugars to carbon dioxide, ethanol, yeast biomass, and flavour components. The lowering of the sugar amount and the increasing presence of ethanol, which has appreciably lesser density than water, both contribute to lowering of the specific gravity of the fermenting beer. Original gravity reading compared to final gravity reading can be used to estimate the amount of sugar consumed and thus the amount of ethanol produced. For example, for a regular beer, original gravity could be 1.050 and final gravity could be 1.010. Similarly, knowing original gravity of a beverage and its alcohol amount can be used to estimate the amount of sugars consumed during the fermentation. The degree to which sugar has been fermented into alcohol is expressed with the term "real degree of fermentation" or "RDF", and is often given as a fraction of original gravity transformed into ethanol and $CO_2$. The RDF of beer is in theory indicative of its sweetness as beers usually have more residual sugar and thus lower RDF.

Filtration steps may involve any of the variety of techniques recognised in the art, which allow partial or substantial separation of water from the beer and thus retention of most of the dissolved therein components in a lower than initial volume. Many of the techniques currently used within the beverage industry rely on the so called membrane technologies, which provide a cheaper alternative to conventional heat-treatment processes and involve separation of substances into two fractions with the help of a semipermeable membrane. The faction comprising particles smaller than the membrane pore size passes through the membrane and, as used herein is referred to as "permeate" or "filtrate". Everything else retained on the feed side of the membrane as used herein is referred to as "retentate".

Typical membrane filtration systems include for example pressure-driven techniques microfiltration, ultrafiltration, nanofiltration and reverse osmosis. As used herein, the term "microfiltration" refers to a membrane filtration technique for the retention of particles having size of 0.1 to 10 µm and larger. Usually, microfiltration is a low-pressure process, typically operating at pressures ranging from 0.34-3 bar[1]. Microfiltration allows separation of particles such as yeast, protozoa, large bacteria, organic and inorganic sediments etc. Then, as used herein, the term "ultrafiltration" designates a membrane filtration technique for the retention of particles having size of about 0.01 µm and larger. Ultrafiltration usually retains particles having molecular weight greater than 1000 Dalton, such as most viruses, proteins of certain sizes, nucleic acids, dextrins, pentosan chains etc. Typical operating pressures for ultrafiltration range from 0.48-10 bar. Further, as used herein the term "nanofiltration" shall be understood as a membrane filtration technique for the retention of particles having size of 0.001 µm to 0.01 µm and larger. Nanofiltration is capable of retaining divalent or multivalent ions, such as divalent salts, and most organic compounds larger than appox. 180 Dalton, which include oligosaccharides and many flavour compounds; while allowing water, ethanol, monovalent ions, and some organic molecules such as many aromatic esters pass through. Operating pressures of 8-41 bar are typical for nanofiltration. Where nanofiltration is operated under inlet pressure within the upper end of this range, from 18 bar above, as used herein, it shall be termed "high pressure nanofiltration". Lastly, as used herein the term "reverse osmosis" shall be understood as referring to a high-pressure membrane process where the applied pressure is used to overcome osmotic pressure. Reverse osmosis usually allows to retain particles having size of 0.00005 µm to 0.0001 µm and larger, i.e. almost all particles and ionic species. Substances with molecular weight above 50 Dalton are retained almost without exception. Operating pressures are typically between 21 and 76 bar, but may reach up to 150 bar in specific applications.

[1] Wherein the unit bar equals 100,000 Pa, in accordance with the definition of IUPAC, [1 Pa=1 N/m²=1 kg/m*s² in SI units.]

Further, as used herein the term "volatile flavour components" shall be understood as any of the substances comprised in beer that contribute to its complex olfactory profile, said substances by their chemical nature having a boiling point lower than that of water. Examples of volatile beer flavour components include but are not limited to acetaldehyde, N-propanol, ethyl acetate, isobutyl alcohol, isoamyl alcohol, isoamyl acetate, ethyl hexanoate, ethyl octanoate, and many more.

For this invention "exogenous aromas" is defined as aromas or flavour compounds not originating from or derived from the fermented beverage as fermented and subjected to the concentration steps (a) and (b) of the method according to the invention. The "exogenous aromas" can be any kind of aroma or flavour compound either natural or synthetic not present in the fermented beverage as fermented and also includes aromas or flavours added to the fermented beverage subjected to the concentration steps (a) and (b) in a post fermentation stage.

DETAILED DESCRIPTION OF THE INVENTION

The present invention concerns a method for preparing an aromatic beverage, the method comprising the steps of:

a) Subjecting a fermented beverage (1) to a first filtration step comprising nanofiltration (A) or ultrafiltration to obtain a retentate fraction (2) and a permeate fraction comprising alcohol and volatile flavour components (3);
b) Subjecting the permeate fraction comprising alcohol and volatile flavour components to a next filtration step comprising reverse osmosis, to obtain a base liquid comprising at least 2% ABV;
c) Combining the base liquid from b) with exogenous aromas thereby obtaining the aromatic beverage.

Preferably, the fermented beverage is a beer or cider, more preferably a lager type of beer having an alcohol content of 5 ABV or higher, more preferably 8 ABV or higher.

FIG. 1 schematically illustrates general scheme of the method for preparing an aromatic beverage according to the present invention. As a first step, beer (1) is subjected to nanofiltration (A) through a semi-permeable membrane acting as physical barrier to passage of most beer components of mean molecular weight (MW)>150-200 Da, but permeable to water, majority of ethanol, monovalent salts and certain amount of beer flavour components. This first fraction retained on the membrane's inflow side is termed retentate (2) and is collected, whereas the fraction comprising alcohol and volatile flavour components is termed permeate (3) and is directed to a second filtration step (B). According to the invention, the second filtration step comprises reverse osmosis and results in separation of the permeate (3) from the previous nanofiltration step (A) into two fractions: first, base liquid comprising at least 2% ABV, which base liquid is collected and blended/mixed with exogenous aromas (7), resulting in desired aromatic beverage (6); and, secondly, a largely aqueous leftover fraction (5), that is recycled to the inlet of the first filtration step. The desired aromatic beverage (6) can now be consumed or further diluted with water according to the desired taste profile and alcohol content.

In general, beer (1) subjected to nanofiltration (A) according to the invention is preferably clear beer, such as a lager, that was treated using any regular beer clarification technique to remove yeast and most of the other particles above 0.2 µm in diameter. Such techniques are standard and well known in the art of beer preparation. For example, they include centrifugation, filtration through e.g. kieselguhr (diatomaceous earth) optionally preceded by centrifugation, or other types of standard microfiltration techniques. The beer preferably has an alcohol concentration comprised between 2-16% ABV, preferably between 2.5-10% ABV, most preferably between 3-8% ABV. In case of a beer, the fermented beverage preferably is high gravity beer defined as beer of original gravity of 14-25 °P or even higher.

In line with the above, the present invention is based on the finding that nanofiltration of beer, high-pressure nanofiltration in particular, not only allows to retain majority of larger beer flavour compounds in the retentate but also provides a good throughput of alcohol to the first permeate, thereby allowing production of a neutral beer base in the second filtration step. In an advantageously economical embodiment, nanofiltration is performed as a multi-stage operation, wherein the retentate is progressing from one stage to the next one while becoming more and more concentrated and a majority of the alcohol in the beer is transferred to the permeate. It has been observed that such high concentration potential can particularly be achieved using polymeric spiral membranes in range of 150-200 Daltons or similar. Examples of such membranes include thin film composite ATF (alternating tangential filtration, Refine Technology) membranes such as the ones currently available from DOW and Parker domnick hunter.

After the nanofiltration step, the permeate fraction is fed to the second filtration step b) in order to further remove taste characteristics of the original beer, said step comprising reverse osmosis.

In a possible embodiment of the present invention, the step b) of the method of the invention first comprises reverse osmosis; and then further comprises at least one additional treatment of the fraction comprising ethanol, obtained following said reverse osmosis, said treatment comprising fractionation, preferably distillation, or reverse osmosis. In said embodiment the aqueous permeate being the fraction comprising alcohol and volatile flavour components is first subjected to a step comprising reverse osmosis to obtain a retentate fraction comprising alcohol at a higher concentration than before the step comprising reverse osmosis and leftover fraction, after which said retentate fraction comprising alcohol is further subjected to at least one further concentration step comprising fractionation, preferably distillation, or reverse osmosis, to obtain a base liquid comprising alcohol and a leftover fraction.

A in a further development of the embodiments of the present invention, a method is provided wherein the reverse osmosis is a high resolution reverse osmosis i.e. reverse osmosis conducted under operating pressure comprised within the range of 60-120 bar and at temperature of 0-12° C.

The invention claimed is:

1. A method for preparing an aromatic beverage comprises the steps of:
    (a) Subjecting a fermented beverage (1) to a first filtration step comprising nanofiltration (A) or ultrafiltration to obtain a retentate fraction (2) and a permeate fraction comprising alcohol and volatile flavour components (3);
    (b) Subjecting the permeate fraction comprising alcohol and volatile flavour components to a second filtration step comprising reverse osmosis to further remove taste characteristics of the fermented beverage and obtain a neutral base liquid comprising alcohol at a higher concentration than before the step comprising reverse osmosis, wherein the neutral base liquid comprises at least 2% ABV;
    (c) Combining the neutral base liquid from (b) with exogenous aromas thereby obtaining the aromatic beverage.

2. The method according to claim 1, wherein the fermented beverage is a beer or a cider.

3. The method according to claim 1, wherein the nanofiltration (A) in step (a) is a high-pressure nanofiltration, defined as nanofiltration conducted under a pressure in the range of 18-41 bar.

4. The method according to claim 1, wherein the second filtration step (B) in step (b) first comprises reverse osmosis, and then further comprises at least one additional treatment of the fraction comprising ethanol obtained following said reverse osmosis, said treatment comprising distillation, fractionation, or reverse osmosis.

5. The method according to claim 1, wherein the neutral base liquid (4) comprising alcohol in step (b) comprises between 2-20% ABV.

6. The method according to claim 1, wherein the fermented beverage (1) is high gravity beer defined as beer of original gravity of 14-25°P or even higher.

7. The method according to claim 1, wherein the fermented beverage (1) comprises alcohol at a concentration between 2-20% ABV.

8. The method according to claim 2, wherein the nanofiltration (A) in step (a) is a high-pressure nanofiltration, defined as nanofiltration conducted under a pressure in the range of 18-41 bar.

9. The method according to claim 8, wherein the second filtration step (B) in step (b) first comprises reverse osmosis, and then further comprises at least one additional treatment of the fraction comprising ethanol obtained following said reverse osmosis, said treatment comprising distillation, fractionation, or reverse osmosis.

10. The method according to claim 9, wherein the neutral base liquid (4) comprising alcohol in step (b) comprises between 2-20% ABV.

11. The method according to claim 10, wherein the fermented beverage (1) is high gravity beer defined as beer of original gravity of 14-25°P or even higher.

12. The method according to claim 11, wherein the fermented beverage (1) comprises alcohol at a concentration between 2-20% ABV.

* * * * *